(12) United States Patent
Lee et al.

(10) Patent No.: US 11,665,214 B2
(45) Date of Patent: May 30, 2023

(54) METHOD AND APPARATUS FOR RECEIVING AUDIO DATA BY USING BLUETOOTH TECHNOLOGY

(71) Applicant: LG ELECTRONICS INC., Seoul (KR)

(72) Inventors: Hyeonjae Lee, Seoul (KR); Minsoo Lee, Seoul (KR); Jinkwon Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/292,329

(22) PCT Filed: Nov. 8, 2019

(86) PCT No.: PCT/KR2019/015163
§ 371 (c)(1),
(2) Date: May 7, 2021

(87) PCT Pub. No.: WO2020/096412
PCT Pub. Date: May 14, 2020

(65) Prior Publication Data
US 2021/0400096 A1    Dec. 23, 2021

(30) Foreign Application Priority Data

Nov. 8, 2018 (KR) .......................... 10-2018-0136900

(51) Int. Cl.
*H04L 29/06* (2006.01)
*H04L 29/08* (2006.01)
(Continued)

(52) U.S. Cl.
CPC .............. *H04L 65/60* (2013.01); *H04L 67/55* (2022.05); *H04W 4/80* (2018.02); *H04W 56/001* (2013.01); *H04W 76/10* (2018.02)

(58) Field of Classification Search
CPC ......... H04L 65/60; H04L 67/26; H04L 29/06; H04L 29/08; H04L 67/55; H04L 65/1069;
(Continued)

(56) References Cited

U.S. PATENT DOCUMENTS

| 10,244,307 B1* | 3/2019 | Tong ..................... H04R 1/1091 |
| 2012/0165966 A1* | 6/2012 | Lyou ................ G11B 20/00007 |
| | | 700/94 |

(Continued)

FOREIGN PATENT DOCUMENTS

| KR | 101551720 | 9/2015 |
| KR | 1020160148646 | 12/2016 |

(Continued)

*Primary Examiner* — George C Neurauter, Jr.
*Assistant Examiner* — Mehulkumar J Shah
(74) *Attorney, Agent, or Firm* — Dentons US LLP

(57) ABSTRACT

The present disclosure provides a method of receiving audio data using Bluetooth Low Energy technology. Specifically, a client device receives, from a server device, an advertisement message including channel information for receiving an extended advertisement message for providing an audio streaming service; receives, from the server device, the extended advertisement message including an indicator related to the audio data of the audio streaming service based on the channel information, wherein the indicator represents that the audio data and audio feedback information for identifying the audio data are transmitted by being grouped; receives, from the sever device, the audio data and the audio feedback information through an isochronous channel; obtains, from a user, specific information related to whether to permit to provide the audio streaming service based on the audio feedback information; and decodes the audio data when the specific information represents permission to provide the audio streaming service.

10 Claims, 19 Drawing Sheets

(51) Int. Cl.
  *H04W 76/10*      (2018.01)
  *H04W 4/80*       (2018.01)
  *H04L 65/60*      (2022.01)
  *H04W 56/00*      (2009.01)
  *H04L 67/55*      (2022.01)

(58) Field of Classification Search
  CPC .. H04L 65/1094; H04L 65/1059; H04W 4/80; H04W 76/10; H04W 56/001; H04W 4/08; H04W 56/00; H04N 21/436; H04N 21/485; H04N 21/4363; Y02D 30/70
  USPC ......................................................... 709/201
  See application file for complete search history.

(56) References Cited

U.S. PATENT DOCUMENTS

| | | | | |
|---|---|---|---|---|
| 2016/0359925 | A1* | 12/2016 | Song | H04W 4/80 |
| 2017/0006127 | A1* | 1/2017 | Hishinuma | H04L 67/10 |
| 2017/0048655 | A1* | 2/2017 | Kwon | H04L 1/00 |
| 2017/0171798 | A1 | 6/2017 | Song | |
| 2017/0251469 | A1* | 8/2017 | Lee | H04W 72/0446 |
| 2017/0295284 | A1* | 10/2017 | Song | H04L 65/1069 |

FOREIGN PATENT DOCUMENTS

| | | |
|---|---|---|
| KR | 101783311 | 9/2017 |
| KR | 101910067 | 10/2018 |

\* cited by examiner

[FIG. 1]
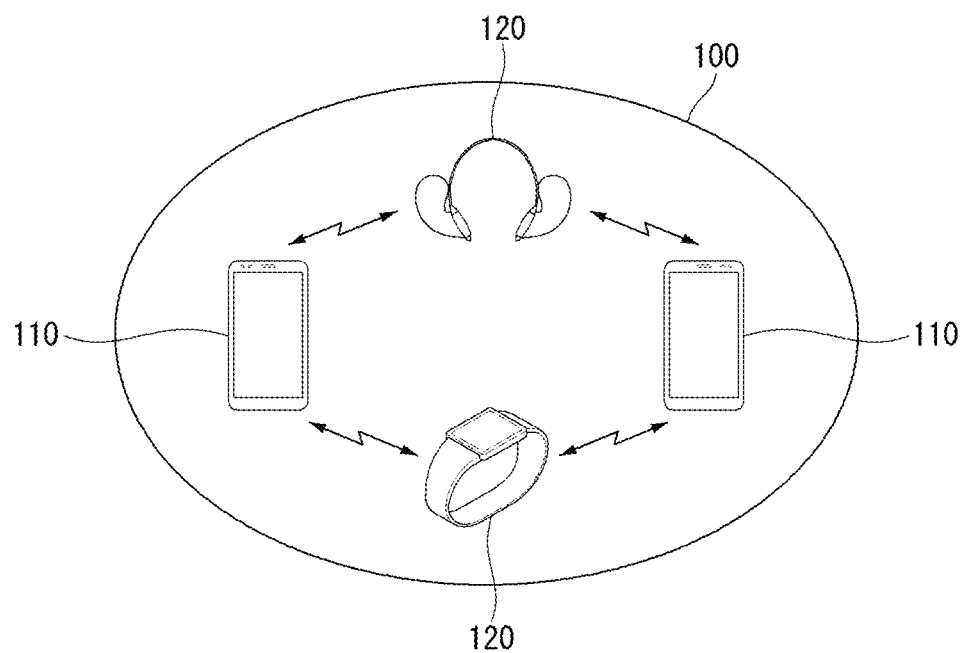

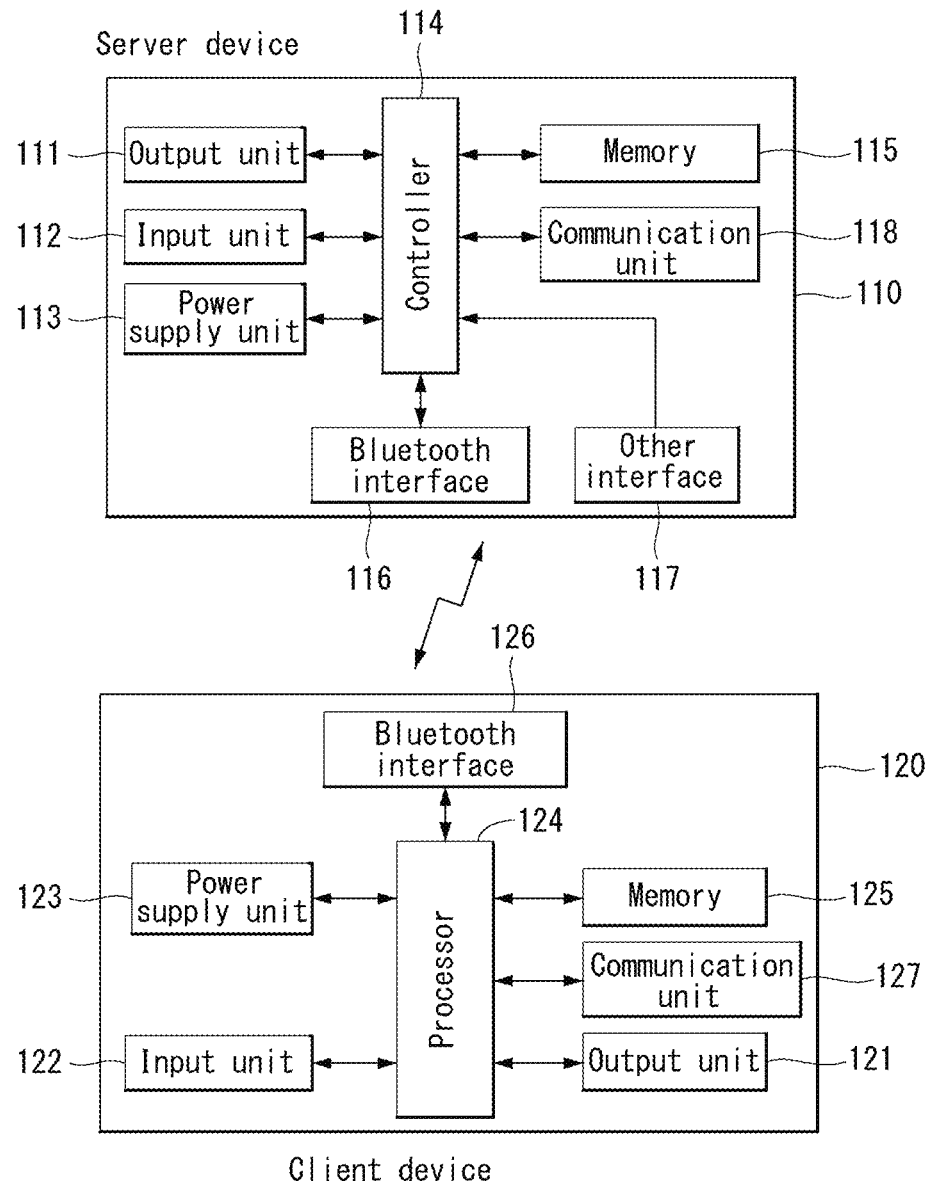
[FIG. 2]

[FIG. 3]
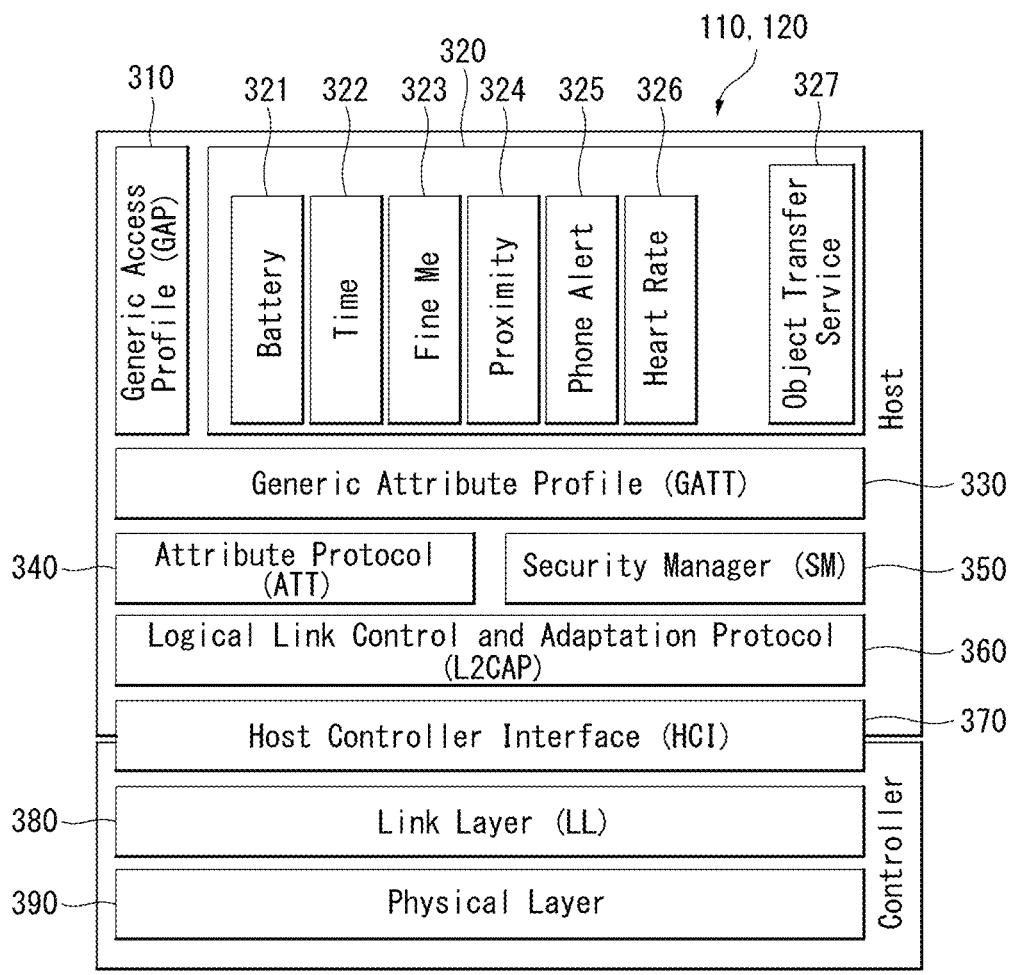

[FIG. 4]
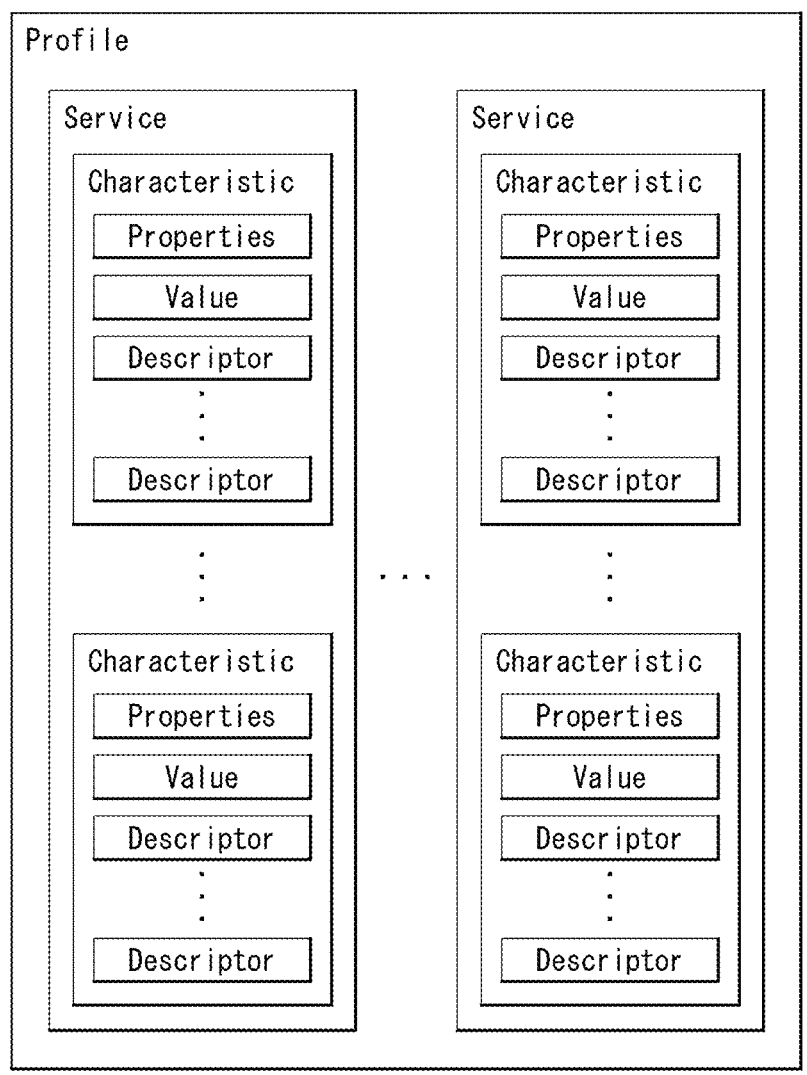

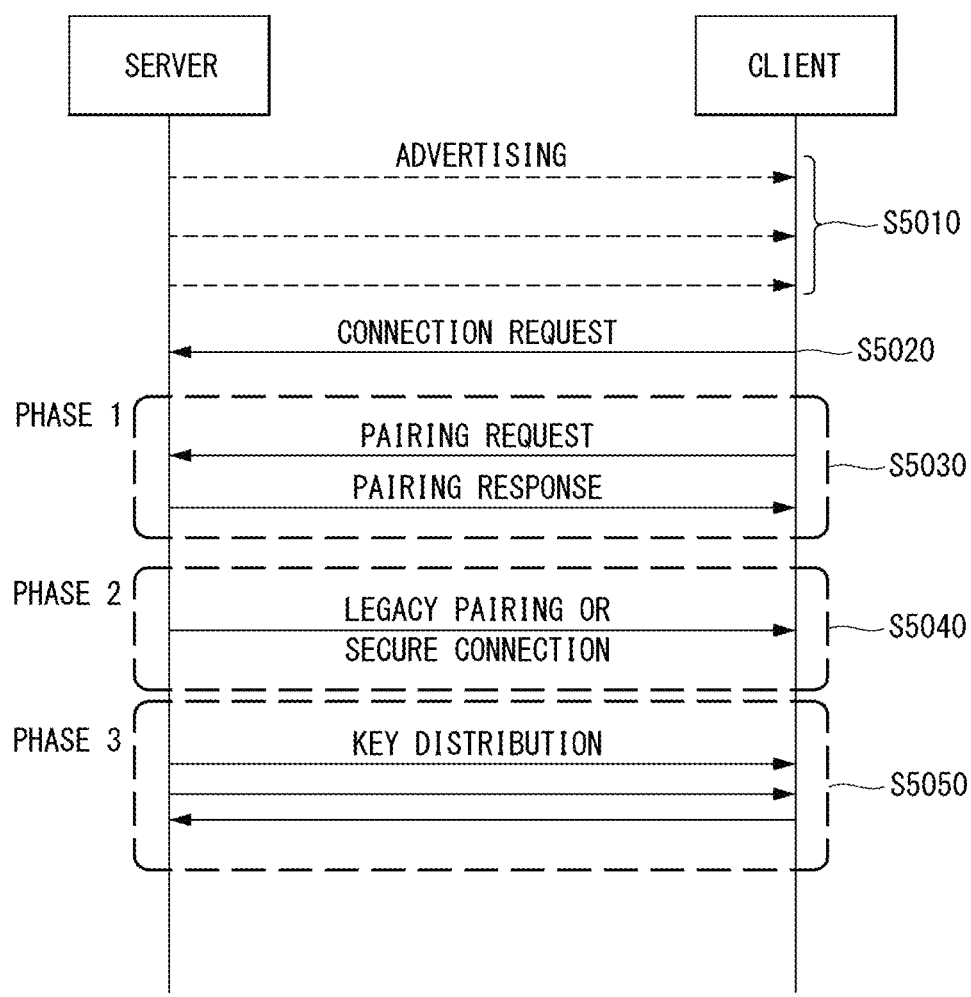
[FIG. 5]

[FIG. 6]
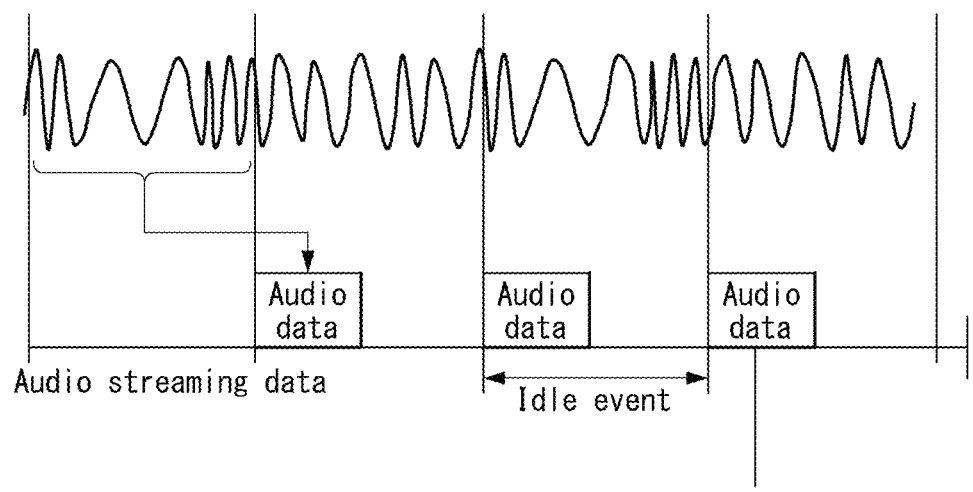

[FIG. 7]
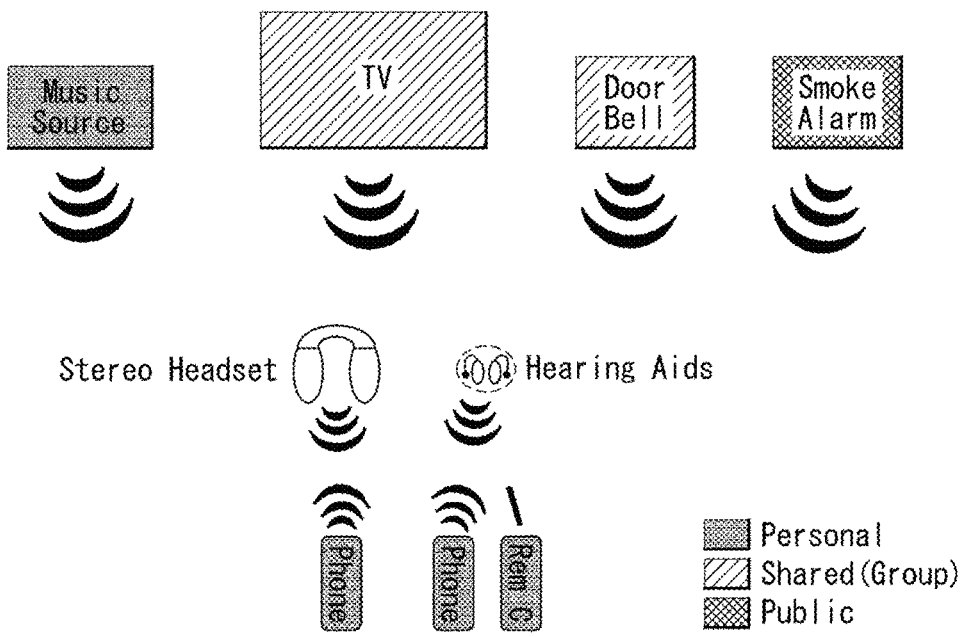

[FIG. 8]
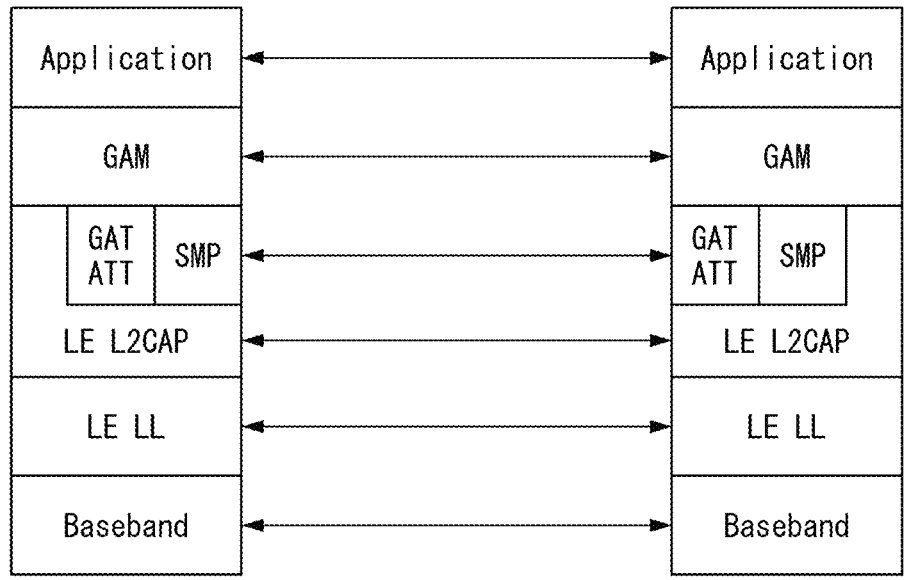
[FIG. 9]
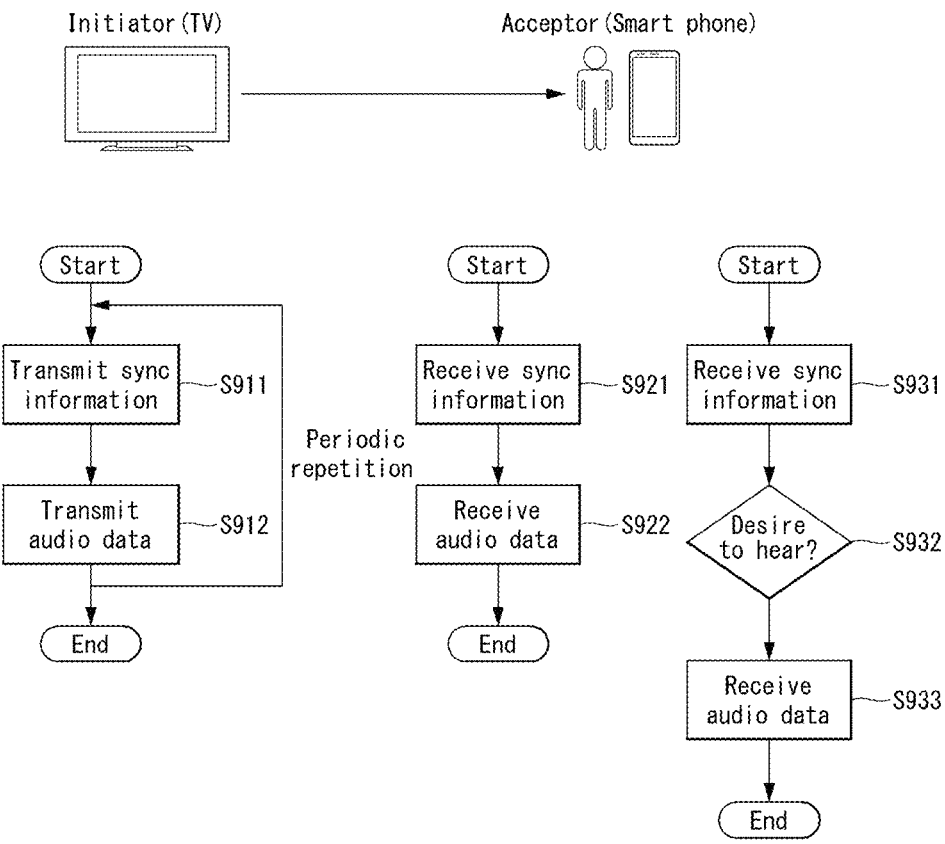

[FIG. 10]
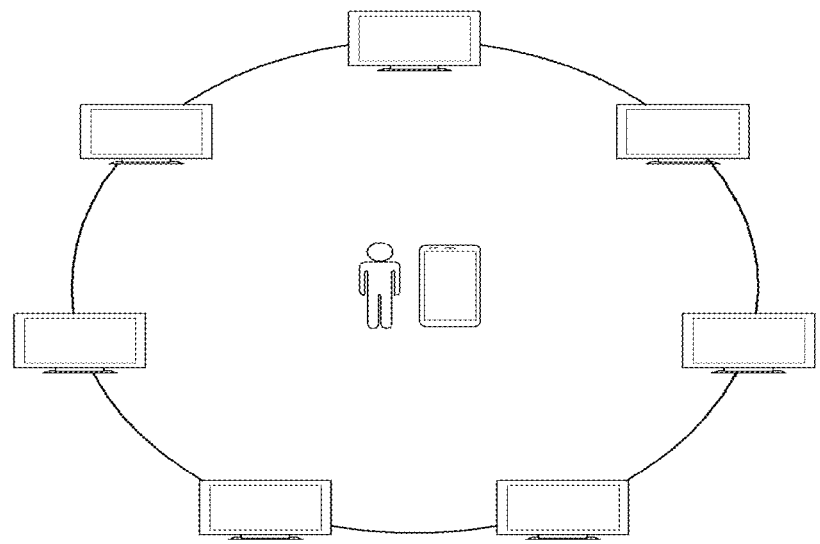
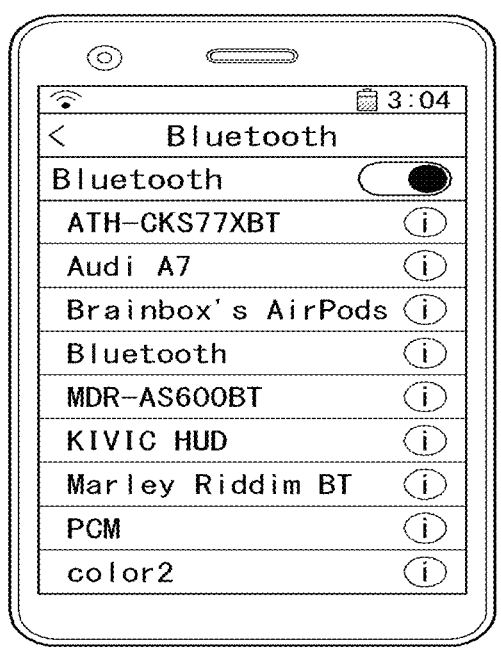

[FIG. 11]
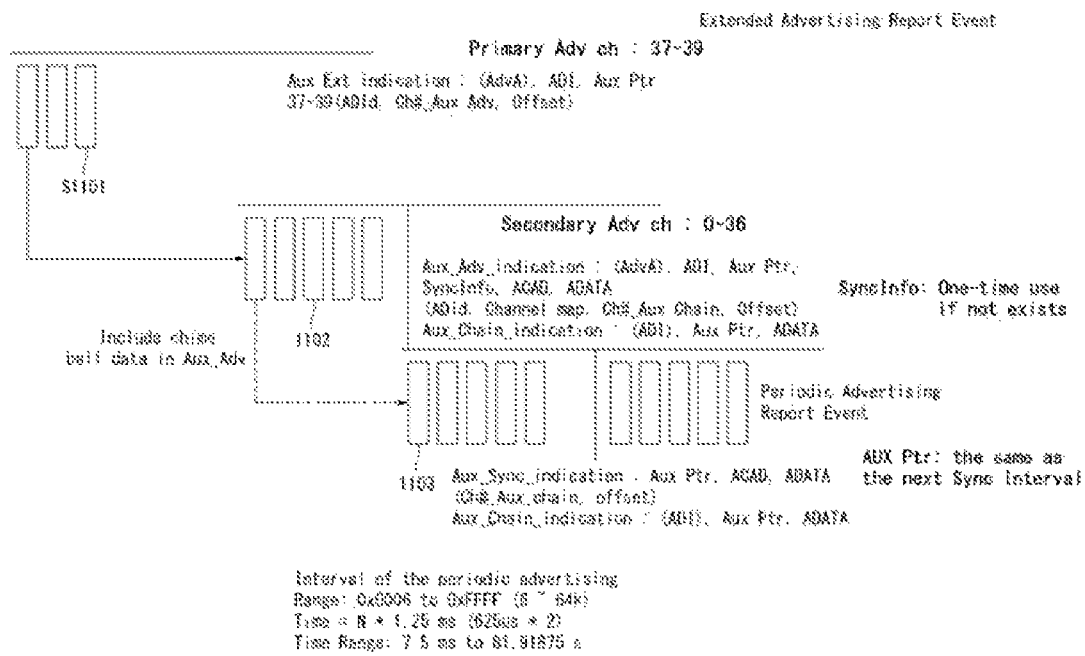
[FIG. 12A]
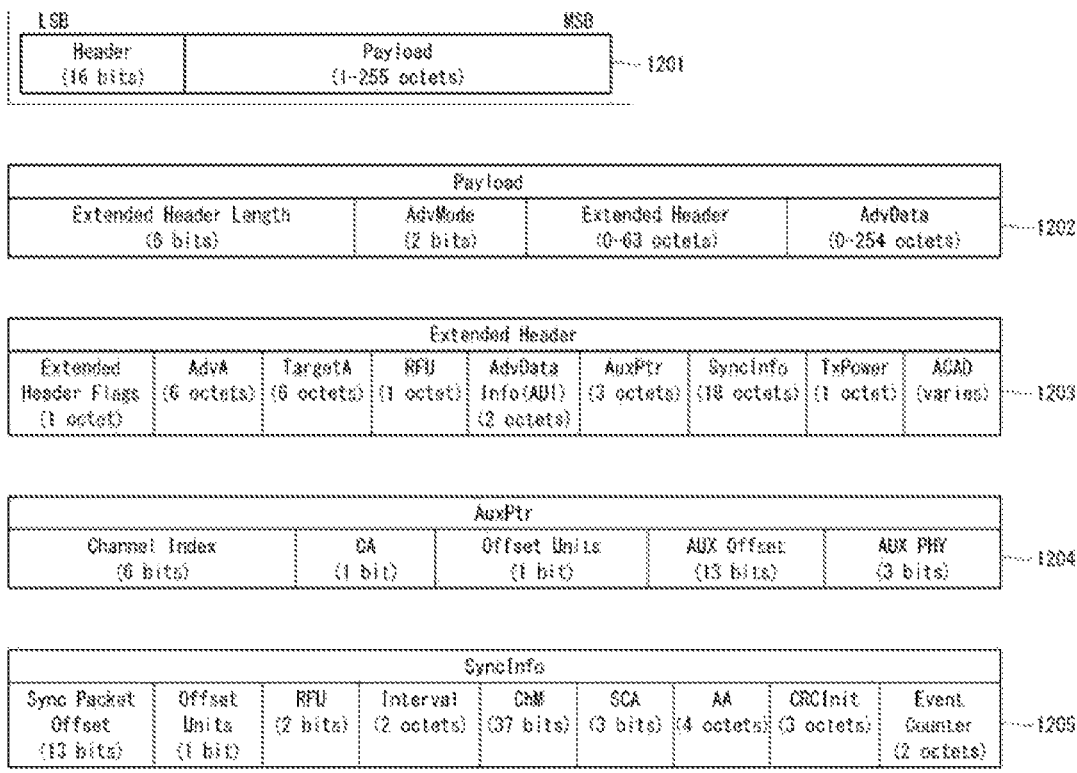

[FIG. 12B]
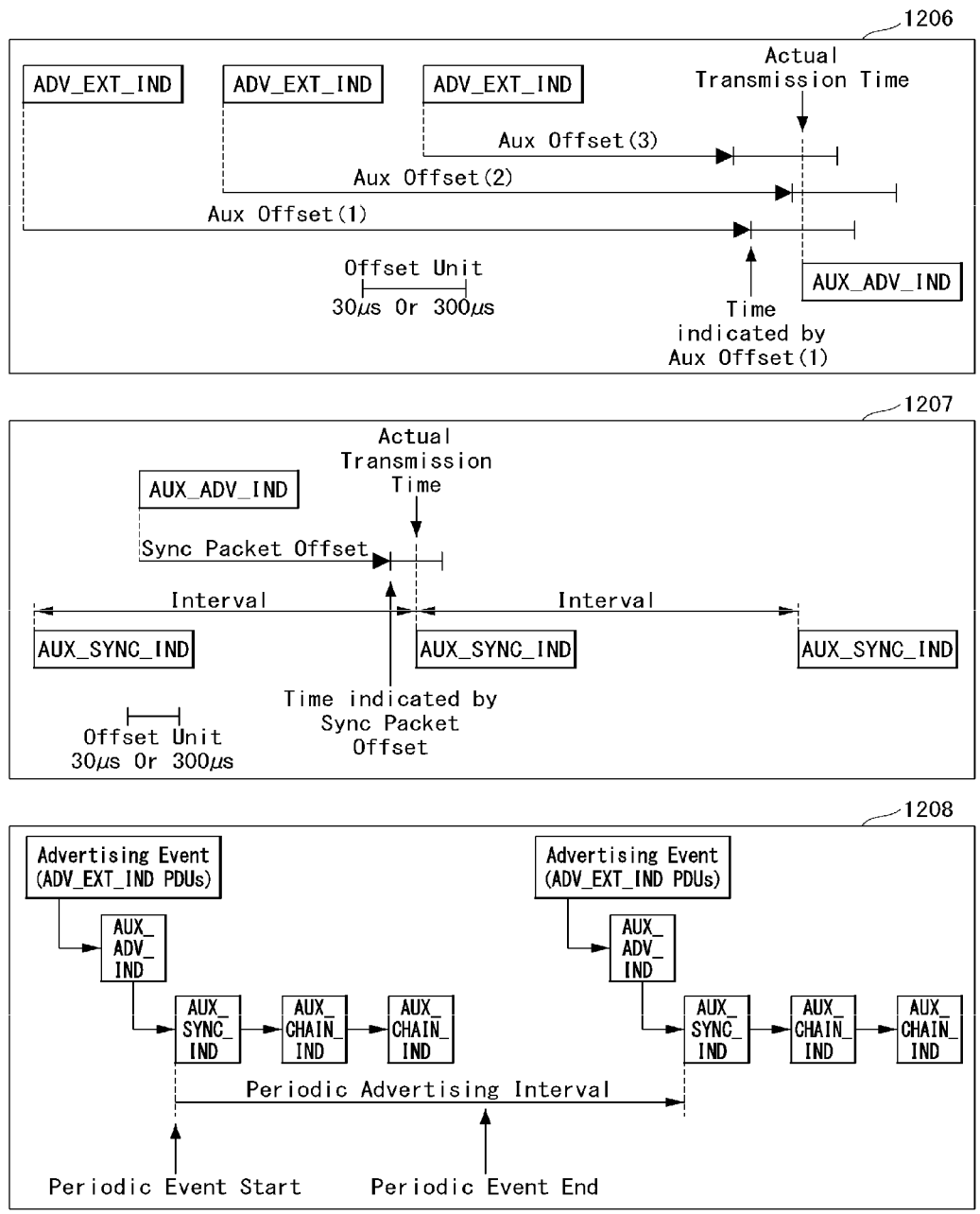

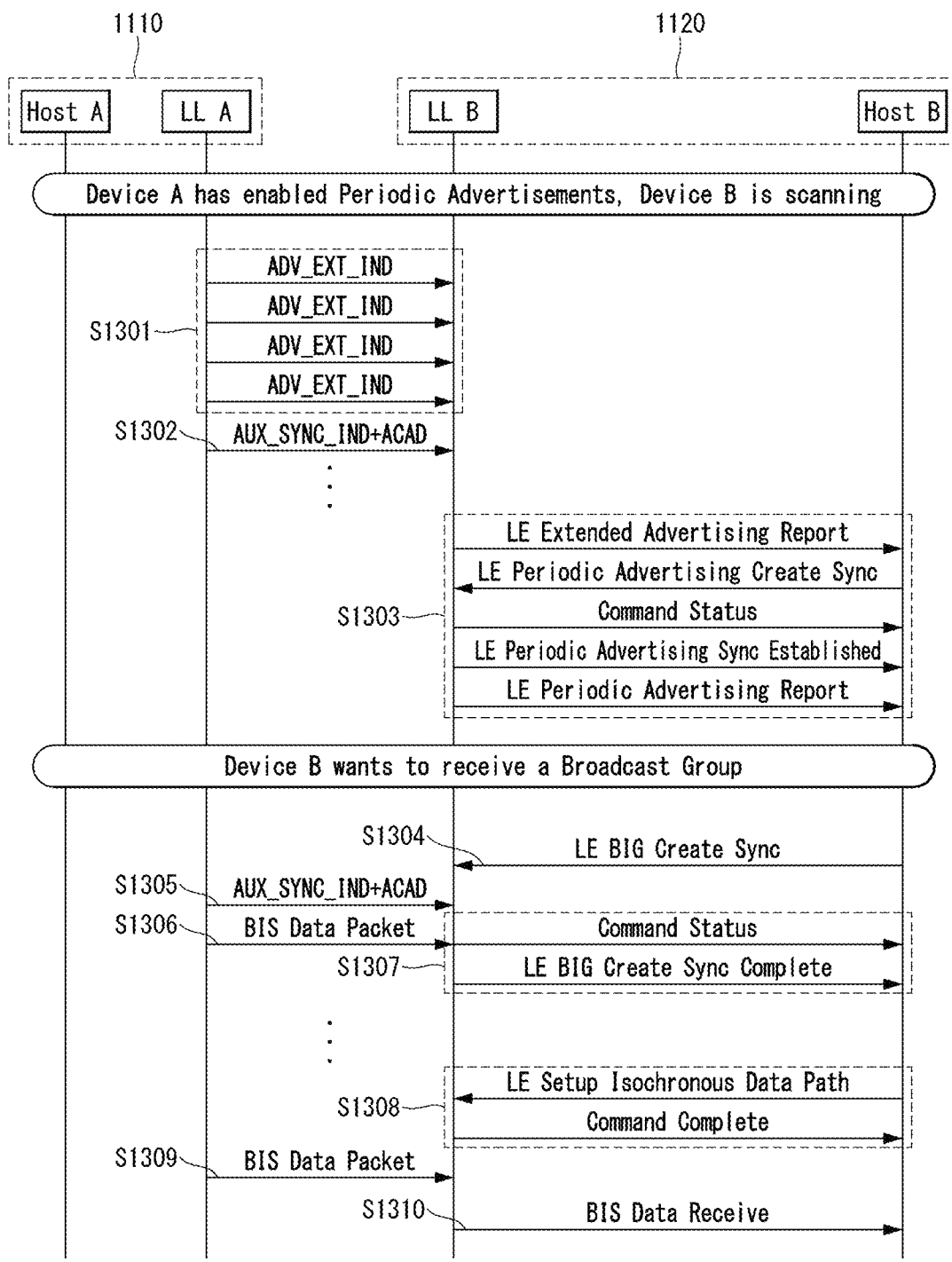
[FIG. 13]

[FIG. 14]
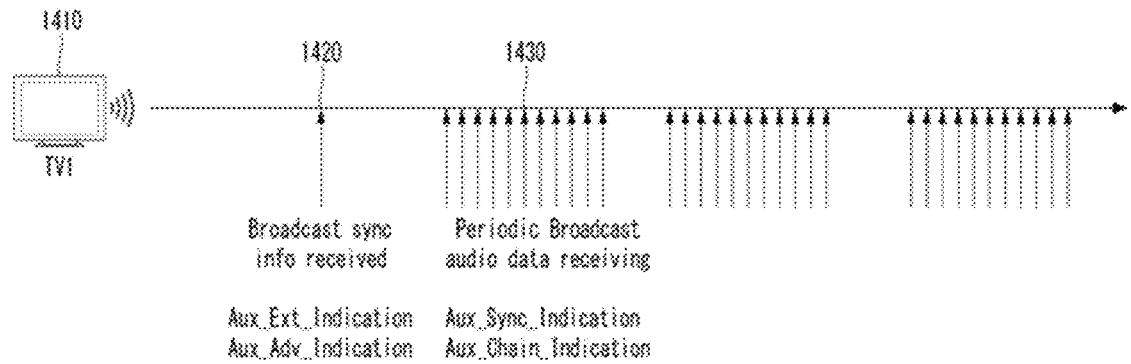
[FIG. 15]
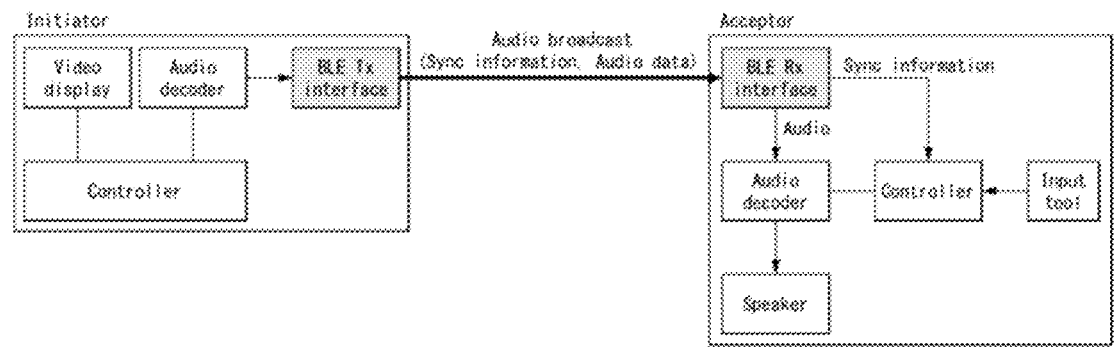
[FIG. 16]
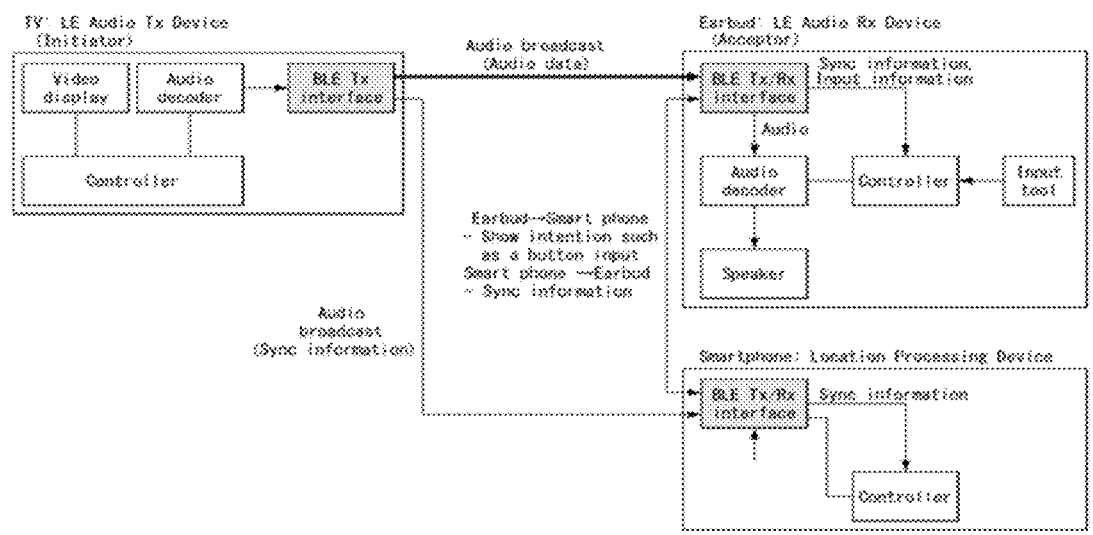

[FIG. 17]
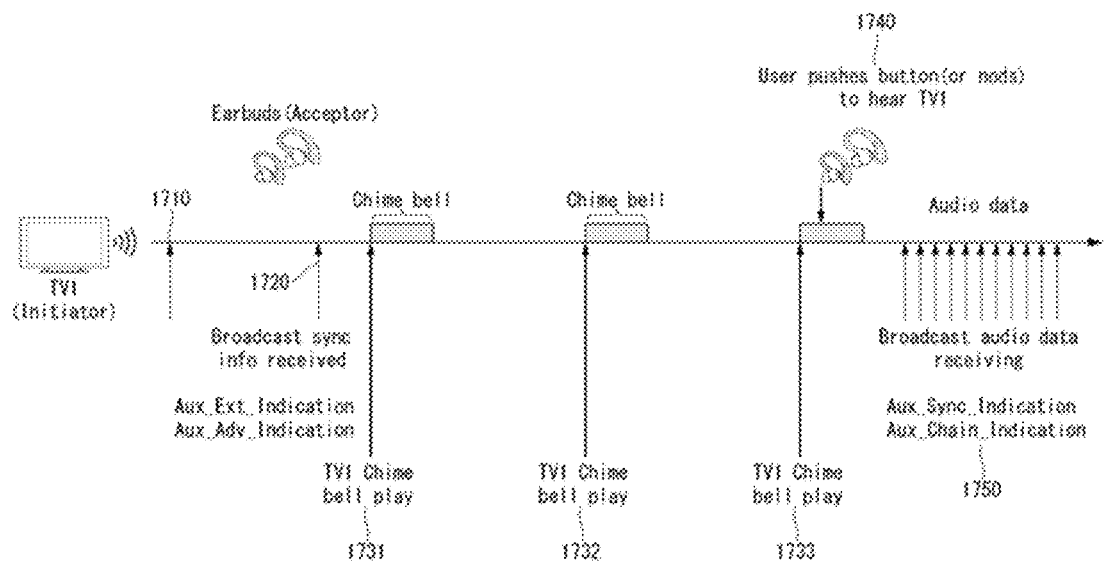
[FIG. 18]
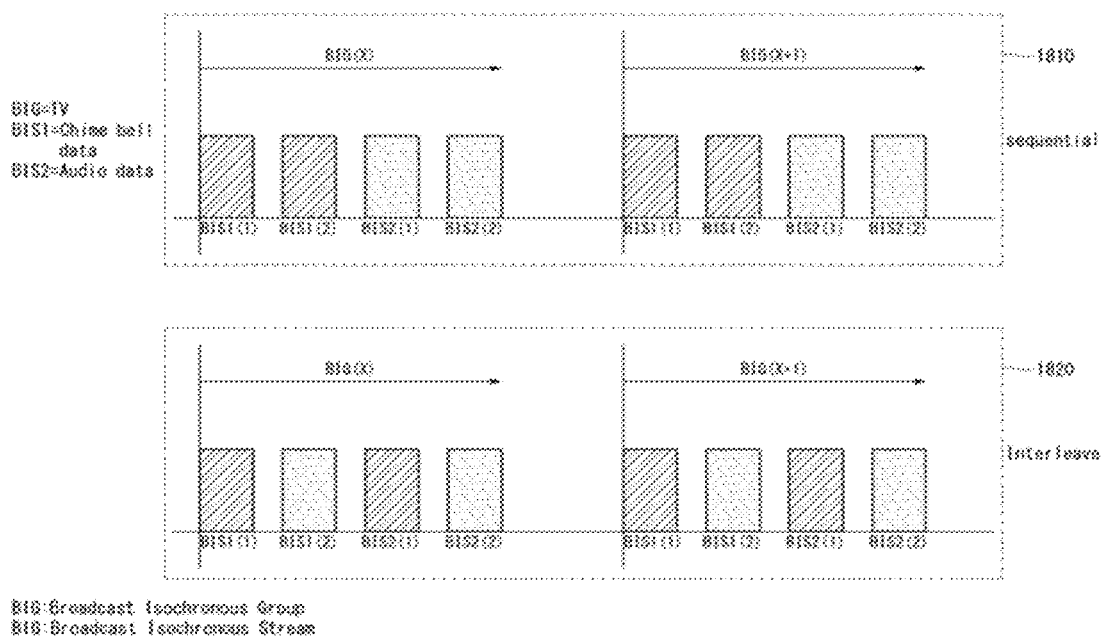

[FIG. 19]
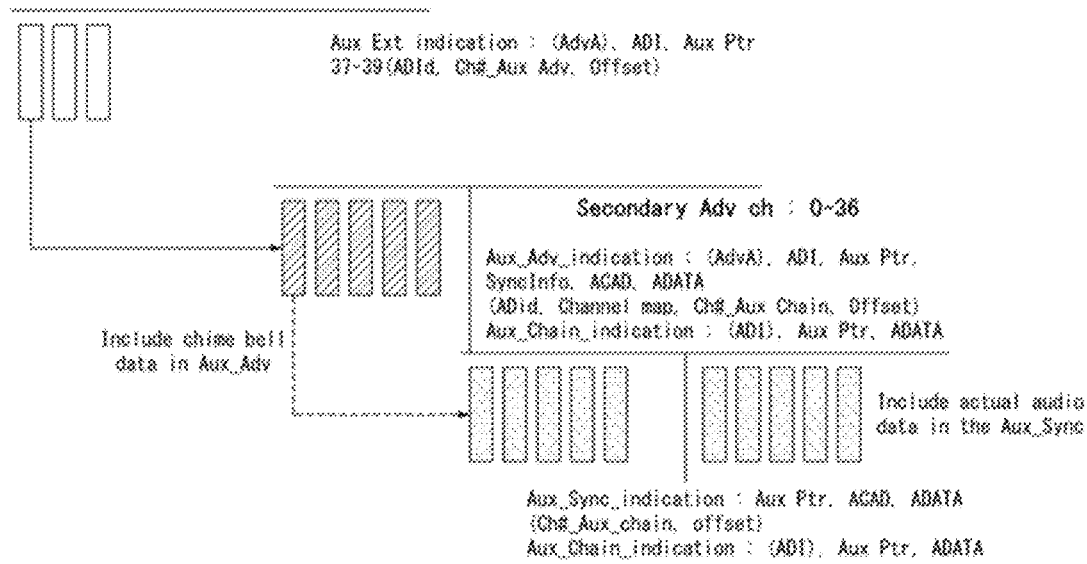
[FIG. 20]
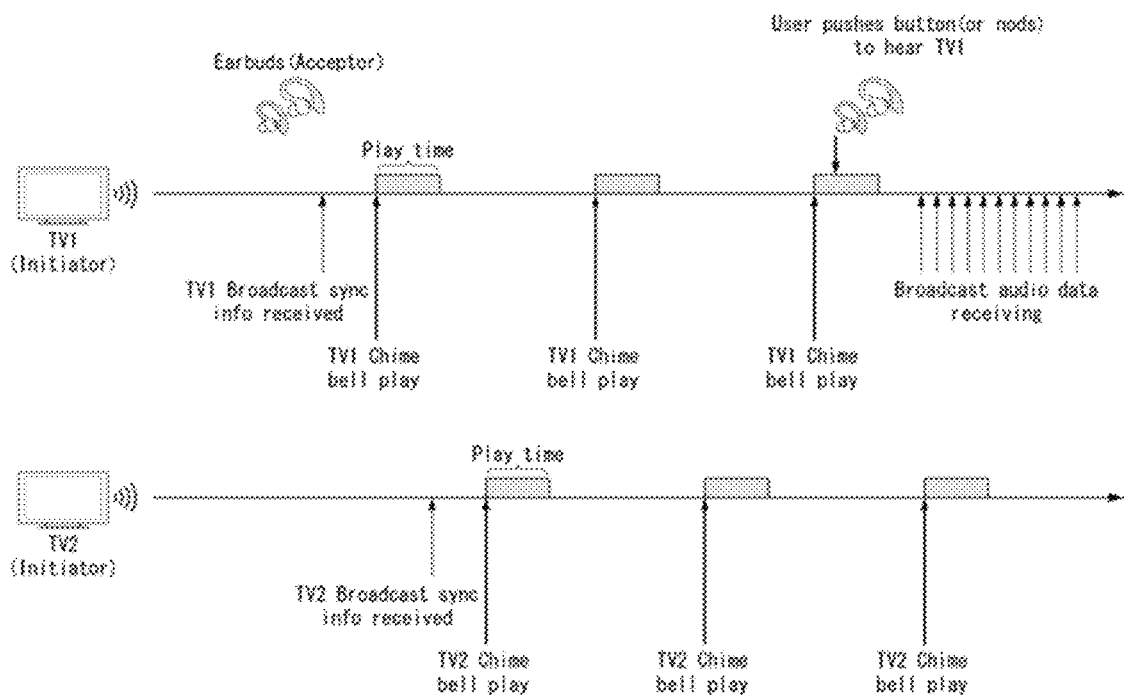

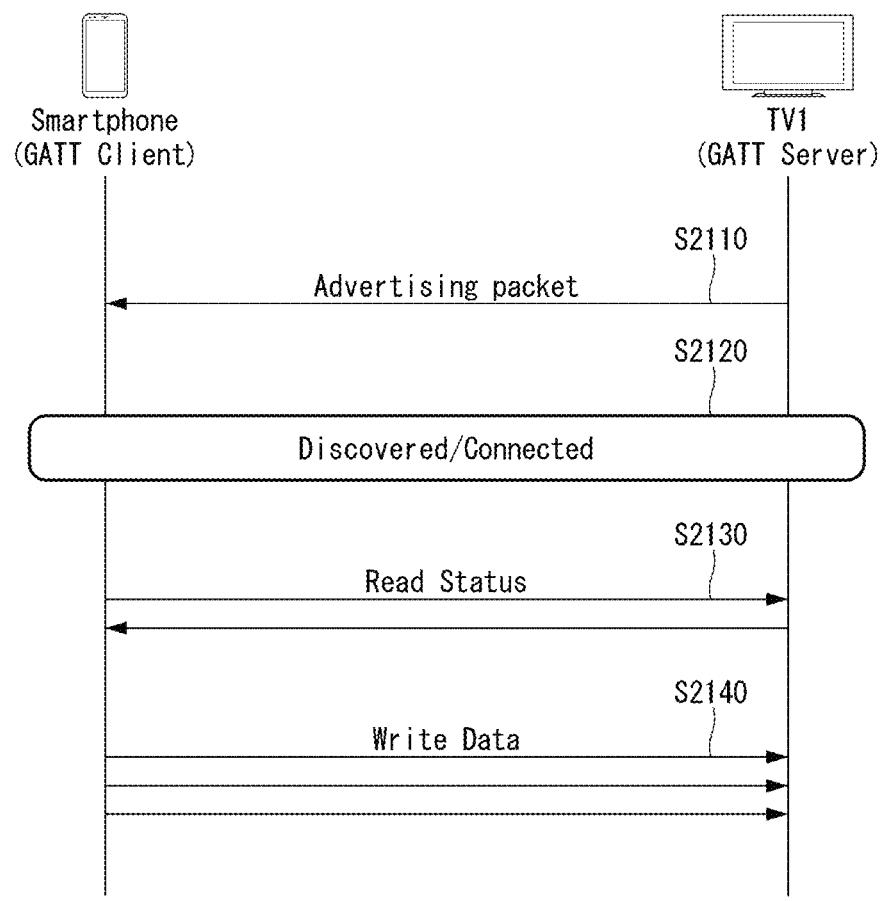
[FIG. 21]

[FIG. 22]
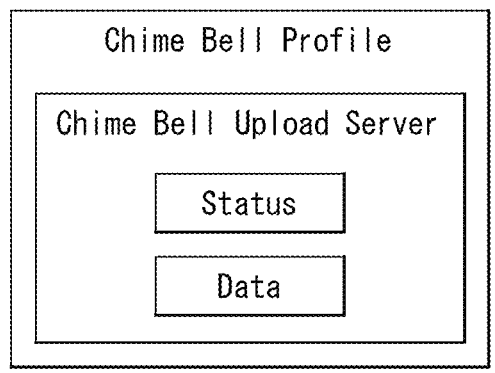
| Characteristic | Parameter |
|---|---|
| Status(Read) | Chime bell name, upload date, version |
| Data(Write) | Seq#, Chime bell data |
[FIG. 23]
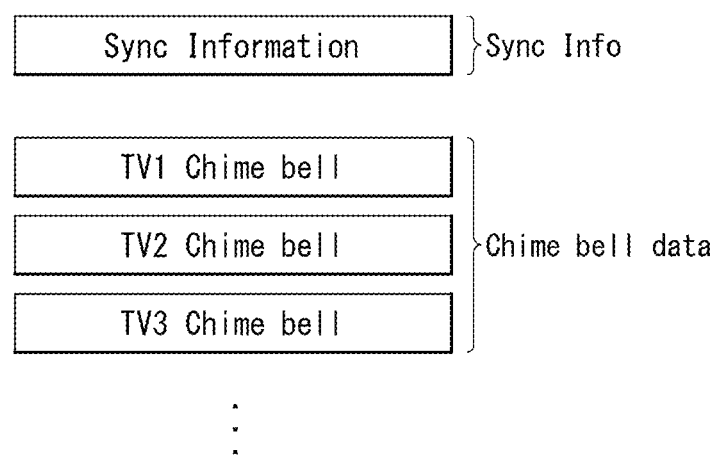
Broadcast channel used separately by
a management server to transmit chime bell data

[FIG. 24]
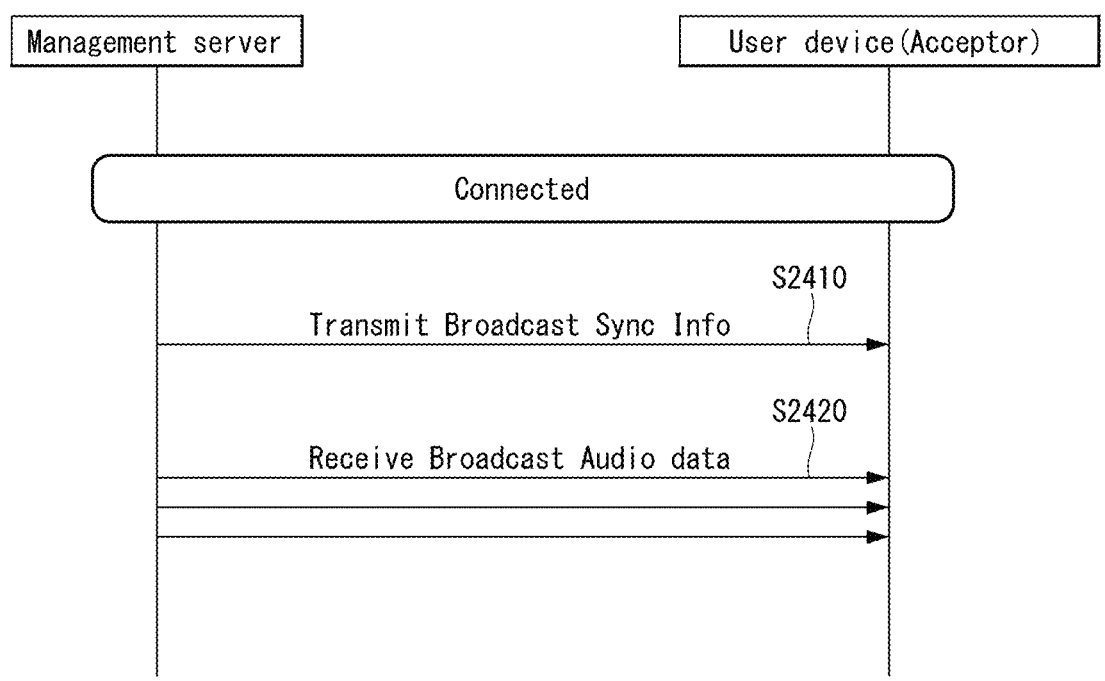

[FIG. 25]
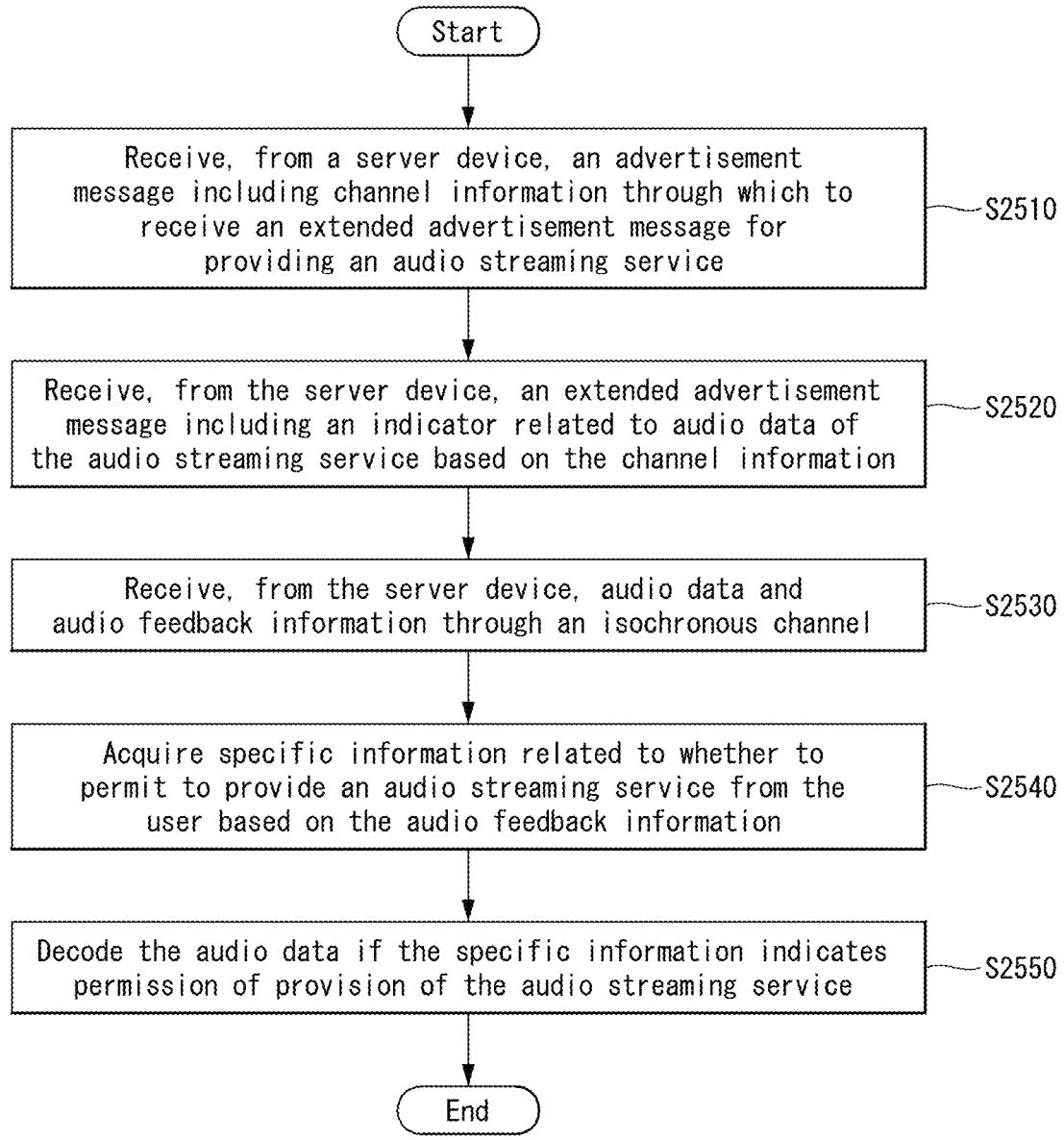

METHOD AND APPARATUS FOR RECEIVING AUDIO DATA BY USING BLUETOOTH TECHNOLOGY

This application is the National Stage filing under 35 U.S.C. 371 of International Application No. PCT/KR2019/015163, filed on Nov. 8, 2019, which claims the benefit of KR Application No. 10-2018-0136900, filed on Nov. 8, 2018, the contents of which are all hereby incorporated by reference herein in their entirety.

TECHNICAL FIELD

The present disclosure relates to a method and an apparatus for receiving audio data using Bluetooth technology, short-range communication technology for a wireless communication system, and, more particularly, a method and an apparatus for receiving audio data based on the audio feedback type using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method and an apparatus for receiving audio data using Bluetooth technology.

Another object of the present disclosure is to provide a method and an apparatus for receiving audio feedback information related to audio data received from a plurality of devices.

Yet another object of the present disclosure is to provide a method and an apparatus for acquiring information related to the type of audio data after a user listens to voice feedback based on the audio feedback information.

Still another object of the present disclosure is to provide a method and an apparatus for receiving only the audio data that a user desires to hear after the user listens to the voice feedback based on the audio feedback information.

Objects of the present disclosure are not limited to the above-mentioned objects. That is, other objects that are not mentioned may be obviously understood by those skilled in the art to which the present disclosure pertains from the following description.

Technical Solution

The present disclosure provides a method of receiving audio data using Bluetooth Low Energy technology.

Specifically, in the present disclosure, In a method of receiving audio data based on Bluetooth low energy technology, the method performed by a client device, comprising: receiving, from a server device, an advertisement message including channel information for receiving an extended advertisement message for providing an audio streaming service; receiving, from the server device, the extended advertisement message including an indicator related to the audio data of the audio streaming service based on the channel information, wherein the indicator represents that the audio data and audio feedback information for identifying the audio data are transmitted by being grouped; receiving, from the sever device, the audio data and the audio feedback information through an isochronous channel; obtaining, from a user, specific information related to whether to permit to provide the audio streaming service based on the audio feedback information; and decoding the audio data when the specific information represents permission to provide the audio streaming service.

Furthermore, in the present disclosure, further comprising: decoding the audio feedback information; and outputting the decoded audio feedback information.

Furthermore, in the present disclosure, wherein the channel information includes an index of a channel through which an extended advertisement message is transmitted and/or synchronization channel information for synchronization between the client device and the server device.

Furthermore, in the present disclosure, wherein the synchronization information includes at least one of a grouping ID (identifier) related to the grouped audio data and the audio feedback information, an audio data ID for identifying the audio data, or an audio feedback ID for identifying the audio feedback information.

Furthermore, in the present disclosure, further comprising: establishing a connection with the server device; transmitting, to the server device, a read request message requesting to read state information of the audio feedback information stored in a first characteristic of the server device, wherein the state information includes at least one of name information of the audio data, date information in which the audio data is stored in the first specific characteristic, or version information of the audio data; and receiving a read response message including the status information from the server device.

Furthermore, in the present disclosure, further comprising: transmitting, to the server device, a write request message requesting to write a characteristic value related to the changed audio feedback information in a second specific characteristic of the server device to change the audio feedback information based on the state information, wherein the write request message includes some data of data constituting the changed audio feedback information; and receiving a write response message from the server device in response to the write request message.

Furthermore, in the present disclosure, wherein each of the write request message includes sequence number information for the some data of the date.

Furthermore, in the present disclosure, further comprising: receiving, from a management server that manages a plurality of servers including the server device, total synchronization information related to synchronization between the plurality of server devices and the client device, wherein the total synchronization information includes synchronization information for each of the plurality of devices.

Furthermore, in the present disclosure, wherein the management server receives and stores synchronization information for each of the plurality of server devices in advance.

Furthermore, in the present disclosure, A client device receiving audio data using Bluetooth Low Energy technology, comprising: a transmitter for transmitting a radio signal; a receiver for receiving a radio signal; and a processor functionally connected to the transmitter and the receiver, wherein the processor configured to: receive, from a server device, an advertisement message including channel information for receiving an extended advertisement message for providing an audio streaming service; receive, from the server device, the extended advertisement message including an indicator related to the audio data of the audio streaming service based on the channel information, wherein the indicator represents that the audio data and audio feedback information for identifying the audio data are transmitted by being grouped; receive, from the sever device, the audio data and the audio feedback information through an isochronous channel; obtain, from a user, specific information related to whether to permit to provide the audio streaming service based on the audio feedback information; and decode the audio data when the specific information represents permission to provide the audio streaming service.

Advantageous Effects

The present disclosure enables to receive audio data using Bluetooth technology.

Also, the present disclosure enables to receive audio feedback information related to the audio data received from a plurality of devices.

Also, the present disclosure enables to acquire information related to the type of audio data after a user listens to voice feedback based on the audio feedback information.

Also, the present disclosure enables to receive only the audio data that a user desired to hear after the user listens to the voice feedback based on the audio feedback information.

Effects which can be achieved by the present disclosure are not limited to the above-mentioned effects. That is, other objects that are not mentioned may be obviously understood by those skilled in the art to which the present disclosure pertains from the following description.

DESCRIPTION OF DRAWINGS

FIG. 1 is a schematic view illustrating an example of a wireless communication system using a Bluetooth low energy technology to which the present invention is applicable.

FIG. 2 illustrates an example of an internal block diagram of a device capable of implementing methods proposed by this specification.

FIG. 3 illustrates an example of a Bluetooth communication architecture to which methods proposed by this specification may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present invention may be applied.

FIG. 6 illustrates characteristics of an audio signal.

FIG. 7 illustrates an example of a home ecosystem for applications where an isochronous channel may be used.

FIG. 8 illustrates an example of a Generic Audio Middleware (GAM) protocol stack to which the present invention may be applied.

FIG. 9 illustrates an example in which a client device discovers a device without filtering.

FIG. 10 illustrates a problem of a case in which a plurality of service devices are present in the surroundings of a client device.

FIG. 11 illustrates an example in which an advertisement message of a server device is transmitted.

FIGS. 12A and 12B illustrate an example of a data format of an advertisement message transmitted by a server device and transmission timing of the advertisement message.

FIG. 13 illustrates an example in which transmission of audio data using Bluetooth Low Energy (BLE) is performed.

FIG. 14 illustrates another example in which transmission of audio data using Bluetooth Low Energy (BLE) is performed.

FIG. 15 illustrates an example in which a method according to the present disclosure is performed.

FIG. 16 illustrates an example in which a method according to the present disclosure is performed.

FIG. 17 illustrates an example in which a method according to the present disclosure is performed.

FIG. 18 illustrates an example in which BIS included in BIG according to the present disclosure is transmitted.

FIG. 19 illustrates an example in which a method according to the present disclosure is performed.

FIG. 20 illustrates an example in which a method according to the present disclosure is performed.

FIGS. 21 and 22 illustrate an example in which a method according to the present disclosure is performed.

FIGS. 23 and 24 illustrate another example in which a method according to the present disclosure is performed.

FIG. 25 illustrates an example of an operation implemented in a device for receiving audio data using Bluetooth technology according to the present disclosure.

MODE FOR INVENTION

In order to help understanding of the present invention, the accompanying drawings which are included as a part of the Detailed Description provide embodiments of the present invention and describe the technical features of the present invention together with the Detailed Description. Like reference numerals principally designate like elements throughout the specification. Further, in describing the present invention, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Hereinafter, a method and an apparatus related with the present invention will be described in more detail with reference to drawings. In addition, a general term used in the present invention should be interpreted as defined in a dictionary or contextually, and should not be interpreted as an excessively reduced meaning. Further, a singular form used in the present specification may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by this specification.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertising message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by this specification may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | LE 1M | LE 2M | LE Coded |
|---|---|---|---|---|---|
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by this specification.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present invention may be applied.

A server transmits to a client an advertising message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smart phone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertising message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Overview of Isochronous Channel

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BR/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

In addition, since the operation of the link layer for transmitting an audio signal is not defined, the BLE has difficulty in transmitting an audio signal. Even if the audio signal is transmitted, a procedure for a user device (e.g., a headset, a phone, etc.) transmit the audio signal to a target device by discovering a device capable of receiving and processing the audio signal needs to be defined.

Thus, the present invention provides a procedure in which the user device may determine devices capable of recognizing and processing the audio signal of the user and transferring the processed audio signal to the target device in order to control the devices with the voice of the user.

Hereinafter, methods for transmitting and receiving periodically generated data (e.g., audio data, voice data, etc.) using the BLE technology will be described in detail.

That is, in the BLE technology, provided is a method for newly defining a channel for transmitting and receiving the periodically generated data and transmitting periodically generated data within a range that does not impair energy performance of the BLE by additionally defining a mechanism related to the newly defined channel.

Terms including audio stream data, audio data, audio streaming, audio stream, and the like may be interpreted as the same meaning.

Hereinafter, for convenience of understanding, it will be assumed that the terms are unified and used as the audio data.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 7 illustrates an example of a home ecosystem for applications where an isochronous channel may be used.

That is, FIG. 7 illustrates an example of a space in which multiple audio conductors and members to which the methods proposed by this specification may be applied may move within or outside each other's area.

As illustrated in FIG. 7, the presence of various conductors and members may imply that the isochronous channel is needed as a method for informing the presence of a member so that the member may obtain information required for configuring the isochronous channel.

The isochronous channel may also be used for transmitting and receiving non audio data.

The member may use isochronous channels to determine whether there are notification messages that may include acquisition information from conductors within a BLE communication range.

Further, the member may use the isochronous channels to receive a request for control information or service data from one or one or more devices acting as a remote controller.

FIG. 8 illustrates an example of a Generic Audio Middleware (GAM) protocol stack to which the present invention may be applied.

An audio architecture including an Audio Middleware Layer may support unicast and broadcast audios using the BLE.

The audio middleware layer facilitates a transition between connections of audio application programs and may develop a more developed user case.

As illustrated in FIG. 8, by adding an audio middleware layer capable of accessing all audio profiles, the GAM may provide a smooth audio service to the user even in a dynamic and multi-profile environment. Since middleware may handle switching between audio mixing of various user cases and the user cases, each profile may concentrate on a specific function.

Since the GAM may support multiple profiles, the user may select an audio content range and an application program which may seamlessly move between voice operating devices.

The GAM defines announcements for the audio streaming and signal transmission for audio control and data transmission. An application layer defines application signaling and required transmission parameters.

When a plurality of devices are present in the surroundings of a user and the user attempts to receive specific audio data transmitted by a specific device though an audio streaming service by using a device, the user's device listens to audio data without involving a separate filtering process after receiving synchronization (sync) information from the surrounding devices. Or, in the case of using a device providing a UI, such as a smart phone, the user has to select a specific device transmitting audio data that the user desires to receive among a plurality of devices discovered through the UI. Therefore, when the user listens to audio data directly without filtering, the user may experience the inconvenience of hearing audio data that the user does not intend to hear. Also, when the user uses a UI installed in a device, the user has to bother to perform separate operations to listen to audio data.

In particular, when there is only one device transmitting audio data in the vicinity of a client device, the inconvenience described above may not be significant; however, when a plurality of devices transmit audio data in the vicinity of the client device, it is difficult to determine which of the plurality of devices synchronizes with the user's device.

In other words, when there are a plurality of devices around the user, devices more than necessary may be discovered if devices in the vicinity of the user are to be discovered or connections to the devices are to be established using wireless communication technologies.

In what follows, a device transmitting audio data may be referred to as a server, a service device, or an initiator.

Also, a user's device receiving audio data may be referred to as a client, a client device, or an acceptor.

FIG. 9 illustrates an example in which a client device discovers a device without filtering.

FIG. 9(*a*) illustrates a flow diagram of operations performed in a server device.

First, the server device transmits synchronization information to surrounding devices S911.

Next, the server device transmits audio data to the surrounding devices S912.

Here, the server device may transmit synchronization information and audio data to the surrounding devices using a broadcasting method. Also, the server device may repeatedly perform the S911 to S912 operations periodically.

FIG. 9(b) illustrates a flow diagram of an operation performed in a client device without a UI.

First, the client device receives synchronization information from the server device S921.

Next, the client device receives audio data from the server device S922.

At this time, the client device receives the audio data without filtering S922.

FIG. 9(c) illustrates a flow diagram of an operation performed in a client device with a UI.

First, the client device receives synchronization information from the server device S931.

Next, the user may determine, through the UI, whether to receive audio data received without filtering S932. At this time, if there exist a plurality of server devices in the vicinity of the client device, a plurality of devices transmitting audio data may be discovered from the display of the client device.

Next, the client device receives audio data from the server device S933.

FIG. 10 illustrates a problem of a case in which a plurality of service devices are present in the surroundings of a client device.

As shown in FIG. 10, in the presence of a plurality of server devices in the vicinity of a client device, all of devices around a user are discovered.

In particular, when surrounding devices are to be discovered through a client device such as a smart phone, the number of devices that may be listed on the display of the client device may be exceeded. Also, the client device displays the name of a discovered device to the user, which makes it difficult to correctly find a specific device transmitting audio data that the user desires to receive.

FIG. 11 illustrates an example in which an advertisement message of a server device is transmitted.

The server device transmits an advertisement message including an Aux_Ext_Indication packet through a Primary channel 1101. The advertisement message may include channel information through which an extended advertisement message is transmitted.

The server device transmits an extended advertisement message through a Secondary channel 1102. The client device may receive the extended advertisement message based on the channel information. The extended advertisement message may include synchronization information and so on.

Next, the server device transmits audio data for providing an audio data streaming service through an isochronous channel 1103. The audio data may be transmitted by being included in an Aux_Sync_Indication packet or an Aux_Chain_Indication packet.

FIGS. 12A and 12B illustrate an example of a data format of an advertisement message transmitted by a server device and transmission timing of the advertisement message.

As shown in FIGS. 12A and 12B, an advertisement PDU 1201 may include a header field of 16 bits and a Payload field having a size of 1-255 octets.

The field 1202 represents the Payload field included in the extended advertisement message. The field may include an Extended Header Length of 6 bits, a 2-bit AdvMode field representing the mode in which an advertisement message is transmitted, an Extended Header field having a size of 0-63 octets, and an AdvData field having a size of 0-254 octets including audio data provided through an audio streaming service.

The field 1203 represents the Extended Header field included in the Payload field of the extended advertisement message. The field includes a 1-octet Extended Header Flag, a 6-octet AdvA field, a 6-octet Target A field, a 2-octet AdvDataInfo (ADI) field including information related to data, an 18-octet SyncInfo field including synchronization information, a 1-octet TxPower field representing transmission power, and a variable-sized ACAD field including audio data.

The field 1204 represents the AUX Ptr field included in the Extended Header field of the extended advertisement message. The field may include a 6-bit channel index field, a 1-bit CA field, a 1-bit Offset Units field, a 13-bit AUX Offset field, and a 3-bit AUX PHY field.

The field 1205 represents the SyncInfo field included in the Extended Header field of the extended advertisement message. The field may include a 13-bit Sync Packet Offset field, a 1-bit Offset Unit field, a 2-Octet Interval field, a 37-bit ChM field, a 3-bit SCA field, a 4-bit AA field, a 3-octet CRCInit field, and a 2-octet Event Counter field.

Referring to FIG. 12A and 1206 of FIG. 12B, the server device transmits an advertisement message including the ADV_EXT_IND packet periodically with an offset having a predetermined value.

Referring to 1207, the server device transmits an advertisement message including the AUX_SYNC_IND packet for synchronization between the server device and the client device periodically at intervals of a predetermined value.

Referring to 1208, the server device may first of all transmit an advertisement message including the ADV_EXT_IND packet to inform the client device of the information on the AUX_ADV_IND packet included in the extended advertisement message transmitted from the secondary channel. Also, the server device may transmit the AUX_SYNC_IND packet and AUX_CHANIN_IND packets on the isochronous channel, and the client device may receive the AUX_SYNC_IND packet and AUX_CHAIN_IND packets transmitting audio data related to an audio streaming service based on the AUX_ADV_IND packet. The processes above may be repeatedly performed periodically at specific intervals.

FIG. 13 illustrates an example in which transmission of audio data using Bluetooth Low Energy (BLE) is performed.

More specifically, FIG. 13 illustrates a problem occurred when the proposed method according to the present disclosure is not applied.

FIG. 13 shows a server device 1310 transmitting broadcast audio data and a client device 1320 receiving the broadcast audio data. Acceptor may be expressed as a "client device".

The server device may periodically transmit the ADV_EXT_IND packet including channel information on an extended advertisement message, the AUX_ADV_IND packet including synchronization information, and the AUX_SYNC_IND packet including audio data through periodic advertising S1301, S1302.

The client device receives the synchronization signal while scanning the advertisement messages transmitted by the server device.

Receiving the synchronization signal, the client device reports to the Host that the client device has received the sync signal at the Link layer of the client device, and the Host enables synchronization between the periodic advertisement message transmitted by the server device and the client device S1303.

Afterwards, the client device receives audio data through the AUX_SYNC_IND and AUX_CHAIN_IND packets S1305-S1310.

In FIG. 13, after receiving a synchronization signal, the client device may immediately output an audible signal related to audio data without performing a separate filtering procedure or may likely launch an App to let a user select audio data through a menu in the case of a device having a UI such as a smart phone.

FIG. 14 illustrates another example in which transmission of audio data using Bluetooth Low Energy (BLE) is performed.

More specifically, FIG. 14 illustrates a problem occurred when the proposed method according to the present disclosure is not applied.

When the server device 1410 broadcasts BLE audio data, the timings 1420 of a client device's receiving broadcasting synchronization information are as follows.

1. Reception of Aux_Ext_Indication packet in the Primary channel

2. Reception of Aux_Adv_Indication packet in the Secondary channel

Since the timings of a client device's receiving synchronization information are the same as the timings above, the client device is in a state of not receiving audio data at the time of receiving the synchronization information. Therefore, the client device may figure out only the information included in the synchronization information. More specifically, the client device may know the offset between used channel map information of the Secondary channel and the Aux_Sync_Indication packet.

The audio data transmitted by the server device may be transmitted to the client device by being included in the Aux_Sync_Indication packet and the Aux_Chain_Indication packet transmitted subsequently 1430. In this case, the user inevitably hears the audio data transmitted by the server device regardless of the user's intention. Or, in the case of a device having a UI such as a smart phone, the user has to use an App menu to select audio data. This kind of constraint may cause inconvenience to the user in terms of User eXperience (UX).

The present disclosure proposes a method and an apparatus for solving a problem that in the presence of a plurality of server devices around the user, server devices more than necessary are discovered when a user attempts to discover server devices in the vicinity or to establish connections thereto. More specifically, when the user attempts to discover server devices in the surroundings of the user, the present disclosure proposes a method and an apparatus for outputting, to the user, unique voice feedback configured for each server device.

Through the method according to the present disclosure, when there exist a plurality of server devices providing an audio streaming service in the vicinity of the user, discovery of the devices in the vicinity of a user may be performed efficiently.

Also, when a server device using Bluetooth Low Energy (BLE) technology transmits broadcast audio data and one device (server device) transmitting audio data is available, the method according to the present disclosure improves User eXperience (UX) of the user by synchronizing the device to the server device and outputting voice feedback (or a chime bell sound) based on voice feedback information to the user. Here, broadcast audio means audio data transmitted according to a broadcast scheme that enables all of surrounding devices to receive audio data transmitted by a server device.

Also, when a plurality of server devices are present, unique voice feedback configured for each server device may be output to the user, and the user may conveniently select audio data that the user desires to listen to. In particular, by listening to the audio feedback output, the user may select, among a plurality of discovered devices, a specific device transmitting audio data that the user desires to receive. More specifically, using a device not providing a UI such as an earphone rather than a device providing a User Interface (UI) such as a smartphone, the user may still receive (listen to) audio data that the user desires to receive by selecting a specific device transmitting the audio data.

According to the present disclosure, the server device may use a periodic advertising broadcasting method for transmitting BLE audio data to a client device.

The server device may transmit synchronization information for synchronizing a client device with the server device periodically to the surroundings based on the broadcasting method.

The synchronization information may be broadcast through Primary Advertising channel 37-39 and Secondary Advertising channel 0-36. At this time, a 23-byte Aux_Ext_Indication packet may be transmitted through the Primary Advertising channel. The Aux_Ext_Indication packet may include Advertising ID (AdID), a channel index (channel number) of the Secondary Advertising channel, channel map information for synchronization (Ch #Aux_Adv), and offset information representing a time difference between the Primary advertisement packet and the Secondary channel packet (Aux_Ext_Indication). The Primary channel may transmit packets randomly in such a way that a slight temporal deviation is applied to the packets to prevent collision based on an advertising interval.

The Secondary advertising channel uses channel 0 to 36 and sends information for periodically transmitting isochronous audio information to a 255-byte data packet. The information includes the Aux_Adv_Indication packet. The Aux_Adv_Indication packet may include Advertising ID (AdID) and SyncInfo. The SyncInfo may include information for transmitting periodic data, channel map information for frequency hopping, and offset information with respect to the Aux_Sync_Indication packet. The actual audio data transmitted periodically may be transmitted by being included in the Aux_Sync_Indication packet or in the Adv-Data field of the Aux_Chain_Indication packet.

In what follows, a method and an apparatus for receiving audio data using Bluetooth technology according to the present disclosure will be described with respect to (1) a structure for discovering a server device based on voice feedback in a server device and a client device (method 1), (2) server device discovery based on voice feedback of a client device (method 2), and (3) a method for configuring unique voice feedback for a server device (method 3).

Structure for Device Discovery Based on Voice Feedback in a Server Device and a Client Device FIG. 15 illustrates an example in which a method according to the present disclosure is performed.

More specifically, FIG. 15 illustrates an example in which a method according to the present disclosure is performed between one server device and a client device. The server device is responsible for audio transmission configuration, which may usually be a transmission device, a smart phone, or a TV. The client device may be a target device for audio transmission configuration, which may usually be a reception device, a speaker, or an earphone (Earbud).

The server device periodically transmits BLE audio broadcast packets through the BLE Tx interface. The client device receives synchronization information transmitted from the server device.

Next, the client device determines a method by which to receive broadcast audio data. Afterwards, outputting voice feedback to the user and obtaining an input indicating an intention to listen to the broadcast audio data from the user, the client device receives and decodes the audio data broadcast stream. At this time, the user's input may be pushing a button on the client device or nodding the head.

FIG. 16 illustrates an example in which a method according to the present disclosure is performed.

More specifically, FIG. 16 illustrates an example in which a method according to the present disclosure is performed among (i) one server device, (ii) one client device, and a user auxiliary device supporting the proposed method to be performed between the server device and the client device.

Referring to FIG. 16, to reduce signaling overhead of a client device, scanning of advertisement packets may be performed in a user auxiliary device. The user auxiliary device may be a smart phone.

The user auxiliary device receives synchronization information from a server device and transmits the synchronization information to a client device so that the client device may receive broadcasting data transmitted from the server device.

The client device which has received the synchronization information from the user auxiliary device directly receives audio data broadcast information from the server device and decodes the received information.

As another example, the client device and the user auxiliary device are connected to each other in the same way as conventional wireless connection methods; decoding is performed in the user auxiliary device, and the user auxiliary device is connected to the client device through the Unicast scheme to transmit the decoded data to the client device.

Server Device Discovery Based on Voice Feedback of a Client Device

FIG. 17 illustrates an example in which a method according to the present disclosure is performed.

More specifically, FIG. 17 illustrates a process in which a client device receives audio data transmitted by a server device.

The server device broadcasts an advertisement message including synchronization information 1710. When broadcasting an advertisement message including synchronization information, the server device may include not only audio data but also audio feedback information in the Broadcast Isochronous Group Information (BIGInfo) containing the synchronization information, thereby including information indicating broadcasting of the advertisement message and audio feedback information in the advertisement message. The information above may be included in the Aux_Ext_Indication or Aux_Adv_Indication packet. Here, voice may include all types of audible signals that may be heard by a user, including a signal sound.

The audio feedback information is related to the type of audio data that the server device transmits, and the client device may receive the audio feedback information and output voice feedback corresponding to the audio feedback information for a short time interval so that the user may recognize the type of the audio data. Also, the output audio feedback information may be mixed with voice to clearly inform the user of the type of the audio data.

After receiving the synchronization information 1720, the client device delivers only the voice feedback data among audio data and audio feedback information to the host. In other words, since the user has not input the information indicating reception of the audio data, the audio data are not delivered to the host.

The client device decodes the audio feedback information and outputs the decoded information to the user repeatedly 1731, 1732, 1733. When voice feedback corresponding to the audio feedback information is heard repeatedly, the user inputs information related to whether to receive the audio data 1740.

After the user inputs the information, if the user input indicates reception of the audio data, the client device receives the audio data transmitted by the server device and delivers the audio data to the host 1750. On the other hand, if the user does not input the information during a specific timeout period, the client device returns to the initial state. At this time, the audio data and the audio feedback information are not output.

Also, suppose the user wants to receive the audio data transmitted by the server device even though the user has entered an input indicating not to receive the audio data. In this case, the client device has to scan whether the signal strength of the server device is measured to exceed a specific threshold. Measurement of the signal strength may be performed at least through measurement of signal strength of the Aux_Ext packet of the Primary channel. If the signal strength exceeds a specific threshold, the Aux_Ext packet is parsed in the observation procedure, and an extended advertisement report event is delivered to the host.

To summarize, since the same server device transmits audio data and audio feedback information, the two types of audio data are grouped by using one group ID (Broadcast Isochronous Group: BIG), and each data may be denoted by sub ID (Broadcast Isochronous Stream: BIS). In other words, BIG may indicate Initiator; BIS1, audio feedback information; and BIS2, audio data.

Since audio feedback information and audio data are transmitted from one server device, they may be grouped into the same audio group. Therefore, while audio data and audio feedback information may be included in one BIG, the audio data and the audio feedback information may be transmitted by being included in different BISs of the BIG. More specifically, although the audio feedback information included in BIS 1 may be decoded and output to the user as soon as the client device receives the audio feedback information, the audio data contained in BIS 2 may be output by receiving BIS 2 included in the BIG when the client device receives the BIG after the state of the client is changed to Broadcast Stream—Enable procedure.

To perform the operation above, an indicator flag representing whether BIS 1 includes audio feedback information may be included in the synchronization information. At this time, the flag indicating whether the audio feedback information is included may be "chime bell" flag. Based on the chime bell flag, the client device may selectively receive and decode the audio data transmitted by the server device.

FIG. 18 illustrates an example in which BIS included in BIG according to the present disclosure is transmitted.

More specifically, FIG. 18 illustrates an example of a method for multiplexing audio feedback information and audio data when a server device includes the audio feedback information and the audio data in the BIG and transmits them by using an advertisement message.

First, the server device may sequentially transmit a BIS including audio feedback information and a BIS including audio data 1810.

Second, the server device may interleave and transmit a BIS including audio feedback information and a BIS including audio data 1820.

FIG. 19 illustrates an example in which a method according to the present disclosure is performed.

More specifically, FIG. 19 illustrates an example in which a server device transmits audio feedback information to a client device by including the audio feedback information in the Aux_Adv_Indication packet.

In this method, the audio feedback information is included in the Aux_Adv_Indication packet in which synchronization information is used for transmission.

The audio feedback information is included in the ADATA field included in the Aux_Adv_Indication packet. When the space of the ADATA field is not sufficient to include the audio feedback information, the remaining data of the audio feedback information may be included in the Aux_Chain_Indication packet transmitted subsequently.

Also, to help a client device decode the audio feedback information correctly, a flag indicating that the audio feedback information is included in the Aux_Adv_Indication packet may be included. Based on the flag, the client device may determine that the audio feedback information is included in the Aux_Adv_Indication packet, decode the audio feedback information included in the ADATA field of the Aux_Adv_Indication packet, and play the decoded audio feedback information. Here, since the received audio feedback information is intended to be used as voice feedback for informing a user of the type of audio data in a short time period, the time for decoding and playing the audio feedback information lasts only a few seconds. Therefore, voice feedback may be heard to the user without imposing a large burden on the client device for processing the Aux_Sync_Indication packet received subsequently. When the user hears the voice feedback played by the client device and inputs information indicating the user's intention to listen to the audio data, the state of the client device transitions from a Broadcast Streaming—Configuration procedure state.

When the user hears the voice feedback played by the client device and inputs information indicating the user's intention to listen to the audio data, the state of the client device transitions from a Broadcast Streaming—Configuration procedure state to a Broadcast Streaming—Enable procedure state. Afterwards, the client device receives the audio data included in the Aux_Sync_Indication packet (and the subsequent Aux_Chain_Indication packet) and decodes the received audio data.

FIG. 20 illustrates an example in which a method according to the present disclosure is performed.

More specifically, FIG. 20 illustrates a process for a client device to receive audio data transmitted by a plurality of server devices.

When a plurality of server devices broadcast an audio signal (an advertisement message) including audio data and audio feedback information, one client device discovers a plurality of broadcast audio signals transmitted by the plurality of server devices.

In this case, first, when the user selects only one of audio data transmitted by the plurality of server devices, the client device interleaves audio feedback information corresponding to each of the plurality of received audio signals and plays the interleaved audio feedback information at different timings. When the user hears voice feedback related to the audio feedback information of the audio data that the user desires to listen to, the user enters information indicating the user's intention to listen to the audio data. Afterwards, the user may listen to the corresponding audio data.

Second, when the user selects none of the audio data transmitted by the plurality of server devices, the client device may limit the number of times the client device repeatedly outputs audio feedback information related to each audio data. The number of repetitions may be limited to around 3 to 5 times, and if no information is input while the voice feedback is being repeated, the voice feedback may no longer be output.

Lastly, the user may want to listen again to the audio data of a server device, which the user did not want to hear. In this case, the client device may continue to monitor the signal strength of an advertisement packet (AUX_EXT) of the Primary channel. When the client device determines that the server device is located in the vicinity, the client device receives synchronization signal and outputs voice feedback based on the audio feedback information.

Method for Configuring Unique Voice Feedback for a Server Device

FIGS. 21 and 22 illustrate an example in which a method according to the present disclosure is performed.

More specifically, FIGS. 21 and 22 illustrate an example of a method for configuring audio feedback information for a server device.

In a specific environment where audio data transmitted by the server device changes in real-time, the same voice feedback (for example, a chime bell) may be output each time the client device is synchronized with the server device. In this case, it becomes difficult for a user to notice that the audio data transmitted by the server device has changed. Therefore, when audio data transmitted by the server device is changed, the audio feedback information, upload GATT Service, may be constructed, and the audio feedback information stored in the server device may be changed by using the GATT Service.

More specifically, a GATT client (client device) receives an advertisement packet from a GATT server (server device) S2110, and the GATT client establishes a connection with the GATT server S2120.

Next, the GATT client transmits, to the server device, a read request message requesting the GATT server to read state information of the audio feedback information stored in a status characteristic of the GATT server and, then, receives a read response message including the state information from the server device S2130.

The state information includes at least one of name information of the audio data, information on the data at which the audio data is stored in the first specific characteristic, or version information of the audio data.

Next, the GATT client transmits, to the GATT server, a write request message requesting to write a characteristic value related to the changed audio feedback information in a second specific characteristic of the server device to change the audio feedback information based on the state information S2140.

The write request message includes part of data constituting the changed audio feedback information.

Although not shown in FIG. 21, the GATT client may receive a write response message from the GATT server in response to the write request message.

At this time, the GATT client transmits new audio feedback information to the GATT server through a data characteristic in the form of a binary file encoded according to the Bluetooth recommended codec.

The size of a characteristic MTU ranges from 21 to 255 bytes, and it may be difficult to transmit a file in one characteristic write operation. Therefore, a file may be transmitted through a plurality of characteristic write operations, and, to this end, the file is transmitted by applying a sequence number to each header of a plurality of data constituting the audio feedback information.

FIGS. 23 and 24 illustrate another example in which a method according to the present disclosure is performed.

A management server device may receive synchronization information from each of surrounding server devices (broadcast advertisers). The management server device may transmit the received broadcast synchronization information of the surrounding server devices to another broadcast scanner device (client device). In this way, the client device is relieved from a burden of having to perform multiple scans to synchronize with a plurality of devices. This method may be referred to as "Scan Offloading".

When a plurality of server devices perform BLE audio broadcasting, usability of a client device may be improved by transmitting the audio feedback information of the entire server devices to the client device simultaneously in advance by the management server device rather than transmitting the audio feedback information to the client device by each server device. The management server device may use the BLE Periodic Advertising Sync Transfer (PAST) technique to transmit synchronization information of the entire server devices to the client device.

As shown in FIG. 23, the total synchronization information including the synchronization information of all of server devices transmitted by the management server device to the client device may be transmitted through a separate broadcast channel for transmission of voice feedback.

In FIG. 24, the client device receives the total synchronization information through a separate broadcast channel from the management server S2410.

Next, the client device receives audio data from server devices in the vicinity based on the total synchronization information S2420.

In addition, Bluetooth bonding refers to a scheme for storing (caching) an encryption key used for pairing a central (master) device and a peripheral (slave) device in both devices and using the encryption key conveniently for connection at a later time.

Being regarded as the data to be used frequently in the BLE audio broadcasting environment, the audio feedback information may be stored in advance. Even if there is only one server device, the audio feedback information may be stored (cached) therein to be used at a later time if the audio feedback information is received frequently.

FIG. 25 illustrates an example of an operation implemented in a device for receiving audio data using the Bluetooth technology proposed in the present disclosure.

At first, a client device receives, from a server device, an advertisement message including channel information for receiving an extended advertisement message for providing an audio streaming service (S2510).

next, the client device receives, from the server device, the extended advertisement message including an indicator related to the audio data of the audio streaming service based on the channel information (S2520).

wherein the indicator represents that the audio data and audio feedback information for identifying the audio data are transmitted by being grouped.

Also, wherein the channel information includes an index of a channel through which an extended advertisement message is transmitted and/or synchronization channel information for synchronization between the client device and the server device.

Additionally, wherein the synchronization information includes at least one of a grouping ID (identifier) related to the grouped audio data and the audio feedback information, an audio data ID for identifying the audio data, or an audio feedback ID for identifying the audio feedback information.

Next, the client device receives, from the sever device, the audio data and the audio feedback information through an isochronous channel (S2530).

Next, the client device obtains, from a user, specific information related to whether to permit to provide the audio streaming service based on the audio feedback information (S2540).

At this time, the client device decodes the audio data when the specific information represents permission to provide the audio streaming service (S2550).

Additionally, the client device may decode the audio feedback information, and output the decoded audio feedback information.

Also, the client device may establish a connection with the server device, transmit to the server device, a read request message requesting to read state information of the audio feedback information stored in a first characteristic of the server device, wherein the state information includes at least one of name information of the audio data, date information in which the audio data is stored in the first specific characteristic, or version information of the audio data, and receive a read response message including the status information from the server device.

wherein, the client device may transmit, to the server device, a write request message requesting to write a characteristic value related to the changed audio feedback information in a second specific characteristic of the server device to change the audio feedback information based on the state information, wherein the write request message includes some data of data constituting the changed audio feedback information, and receive a write response message from the server device in response to the write request message.

Also, wherein each of the write request message includes sequence number information for the some data of the date.

Additionally, the client device may receive, from a management server that manages a plurality of servers including the server device, total synchronization information related to synchronization between the plurality of server devices and the client device, wherein the total synchronization information includes synchronization information for each of the plurality of devices Wherein the management server receives and stores synchronization information for each of the plurality of server devices in advance.

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

Embodiments of the present disclosure may be implemented by various means, for example, hardware, firmware, software, or a combination thereof, and the like. In the case in which an embodiment of the present disclosure is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which one embodiment of the present disclosure is implemented by the firmware or the software, it may be implemented in a form of a module, a procedure, a function, or the like, performing the functions or the operations described above. A software code may be stored in a memory and be driven by a processor. The memory unit may be positioned inside or outside the processor and transmit and receive data to and from the processor by various well-known means.

It is obvious to those skilled in the art that the present disclosure may be embodied in another specific form without departing from the essential feature of the present disclosure. Therefore, the above-mentioned detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure. In the present specification, both the object disclosure and the method disclosure are described, and the description of both disclosures may be complementarily applied as necessary.

INDUSTRIAL APPLICABILITY

As described above, preferred embodiments of the present disclosure are disclosed for the purpose of illustration, and those skilled in the art can alternate, modify, replace, add or the lie various other embodiments within the spirit and technical scope of the present disclosure disclosed in the appended claims below.

The invention claimed is:

1. A method of receiving audio data based on Bluetooth low energy technology, the method performed by a client device, comprising:
receiving, from a server device, an advertisement message including channel information for receiving an extended advertisement message for providing an audio streaming service, wherein synchronization channel information for synchronization between the client device and the server device included in the channel information includes a grouping ID (identifier) related to grouped (i) audio data and (ii) the audio feedback information;
receiving, from the server device, the extended advertisement message including an indicator related to the audio data of the audio streaming service based on the channel information,
wherein the indicator represents that (i) the audio data and (ii) audio feedback information, which is short audio data that identifies the audio data for a user of the client device, are transmitted by being grouped;
receiving, from the server device, (i) the audio data and (ii) the audio feedback information which are grouped through an isochronous channel;
outputting, to the user, only the audio feedback information among (i) the audio data and (ii) the audio feedback information, based on the indicator;
obtaining, from the user, specific information related to whether to permit to provide the audio streaming service based on the output audio feedback information; and
decoding the audio data based on the obtained specific information representing permission to provide the audio streaming service.

2. The method of claim 1, further comprising: decoding the audio feedback information; and outputting the decoded audio feedback information.

3. The method of claim 1, wherein the channel information includes an index of a channel through which the extended advertisement message is transmitted and synchronization channel information for synchronization between the client device and the server device.

4. The method of claim 3, wherein the synchronization channel information further includes at least one of an audio data ID for identifying the audio data, or an audio feedback ID for identifying the audio feedback information.

5. The method of claim 1, further comprising: establishing a connection with the server device; transmitting, to the server device, a read request message requesting state information for the audio feedback information stored in a first characteristic of the server device, wherein the state information includes at least one of name information for the audio data, date information as to where the audio data is stored in the first specific characteristic, or version information for the audio data; and receiving a read response message including the state information from the server device.

6. The method of claim 5, further comprising: transmitting, to the server device, a write request message requesting characteristic value related to changed audio feedback information in a second specific characteristic of the server device to change the audio feedback information based on the state information, wherein the write request message includes data constituting the changed audio feedback information; and receiving a write response message from the server device in response to the write request message.

7. The method of claim 6, wherein the write request message includes sequence number information for the data of the date.

8. The method of claim 1, further comprising: receiving, from a management server that manages a plurality of servers including the server device, total synchronization information related to synchronization between the plurality of server devices and the client device, wherein the total synchronization information includes synchronization information for each of the plurality of devices.

9. The method of claim 8, wherein the management server receives and stores synchronization information for each of the plurality of server devices in advance.

10. A client device configured to receive audio data using Bluetooth Low Energy technology, comprising:
a transmitter for transmitting a radio signal;
a receiver for receiving a radio signal; and
a processor functionally connected to the transmitter and the receiver,
wherein the processor configured to:
receive, from a server device, an advertisement message including channel information for receiving an extended advertisement message for providing an audio streaming service, wherein synchronization channel information for synchronization between the client device and the server device included in the channel information includes a grouping ID (identifier) related to the grouped (i) audio data and (ii) the audio feedback information;

receive, from the server device, the extended advertisement message including an indicator related to the audio data of the audio streaming service based on the channel information, wherein the indicator represents that (i) the audio data and (ii) audio feedback information, which is short audio data that identifies the audio data for a user of the client device, are transmitted by being grouped;

receive, from the server device, (i) the audio data and (ii) the audio feedback information which are grouped through an isochronous channel;

output, to the user, only the audio feedback information among (i) the audio data and (ii) the audio feedback information, based on the indicator;

obtain, from the user, specific information related to whether to permit to provide the audio streaming service based on the output audio feedback information; and decode the audio data based on the obtained specific information representing permission to provide the audio streaming service.

* * * * *